UNITED STATES PATENT OFFICE.

JOHN H. STEVENS, OF NEWARK, NEW JERSEY, ASSIGNOR TO THE CELLULOID COMPANY, OF SAME PLACE, A CORPORATION OF NEW JERSEY.

PYROXYLIN COMPOUND.

SPECIFICATION forming part of Letters Patent No. 583,516, dated June 1, 1897.

Application filed November 7, 1895. Serial No. 568,212. (No specimens.)

*To all whom it may concern:*

Be it known that I, JOHN H. STEVENS, a citizen of the United States, residing at the city of Newark, in the county of Essex and State of New Jersey, have invented certain new and useful Improvements in Pyroxylin Compounds, of which improvements the following is a specification.

The various compositions to which the present invention relates are employed in the arts mainly as imitations of substances, and consist of soluble pyroxylin combined with or dissolved in certain other substances known as "solvents of pyroxylin." Although the final or useful form of the different compounds of this class is generally that of a dried or solid material, the different processes of conversion into this final solid form involve, as is well understood, the employment of pyroxylin solutions or mixtures of varying consistency as to plasticity, stiffness, or fluidity, which conditions generally depend upon the kind of solvent used and its proportion to the amount of pyroxylin.

There are two classes of solvents—liquid solvents, of which wood-spirit is a good example, and solid solvents, of which camphor is a good representative. Solvent mixtures are also formed by combining two or more substances with each other. The components of the mixed solvent in such a case may not necessarily be possessed of individual solvent power. For instance, alcohol, which is practically a non-solvent in itself, forms a good solvent mixture when camphor is dissolved in it. The various applications of this important art require the employment of complex mixtures in the solvent, single substances being rarely used for such purposes. Hence while the advancement of this art has, as is well known, depended largely on the discovery and application of new single solvent substances, yet it has required also the invention of combinations of solvents by which effects are produced quite different from those produced when single solvents are employed alone.

The action of solid solvents is quite distinct from that of liquids, in that the solid solvent after the seasoning or drying of the material remains a part of the finished product and gives the property of plasticity under heat, as is well understood. Although numerous solid solvents have been discovered and applied, camphor is still regarded as a solvent of great importance in this art, notwithstanding the difficulties attending its use. Hence special attention has been directed to so modifying the action of the camphor that its excellent solvent powers and other characteristics could be advantageously utilized.

The principal objection to the use of camphor is its high melting-point, which necessitates the use of so much heat in molding the thoroughly-dried compounds containing camphor that there is a tendency to discoloration. The difficulty has been met to a certain extent by leaving in the final product a small proportion of liquid solvent, such as alcohol, which lowers the melting-point of the camphor and permits the manipulation of the compound without destroying the good qualities of the material. There is such a wide difference, however, between the volatility of the camphor and the liquid menstruum or menstrua employed with it that it is difficult to control the plastic properties by such means, because the relative proportion of camphor and liquid solvent varies according to the conditions of evaporation or seasoning.

It is the object of the present invention to form pyroxylin compounds in such a manner that their plasticity will be independent of the presence of liquids in the compounds. To accomplish this, I employ in conjunction with camphor certain solid substances which I have discovered possess the power to form with the camphor and pyroxylin a compound which is plastic at lower temperatures than if they were omitted. These solid substances combine with camphor to form a solid solvent—that is, a solid which when melted by means of heat dissolves pyroxylin. The group of substances which I employ for this purpose while possessing this common property of forming useful solvents in conjunction with camphor, yet have varying individual characteristics which they impart to a certain extent to the pyroxylin compound. The group to which I refer embraces certain crystalline halogen substances and nitro derivatives thereof. They are the crystalline chlorids of toluol and nitrochlorids of benzyl, the crystalline chlorids, bromids, nitrochlorids, and nitrobromids of benzol, the crystalline chlorids of naphthalene; the crystalline phenolbromids and phenolchlorids, and camphorbromid.

*The crystalline chlorids of toluol and nitrochlorids of benzyl.*—The nitrobenzyl chlorid, $C_6H_4(NO_2).CH_2Cl$, either the ortho or the para variety, is a solvent of pyroxylin in itself or in combination with camphor when melted by means of heat, which gives an additional value to its employment. Among the toluol chlorids I prefer to use the trochlortoluol, $(C_7H_5Cl_3,)$ melting-point 82° centigrade. It is difficult to obtain the nitrochlorids of benzyl in a sufficient state of purity to form colorless pyroxylin products. Hence I would recommend their use in compounds of dark color or in such tints as might not be affected by discoloration.

*The crystalline chlorids, bromids, nitrochlorids, and nitrobromids of benzol.*—There is a large number of modifications of these substances, but of the chlorids I prefer the ordinary benzol bichlorid, $(C_6H_4Cl_2,)$ melting-point 53° centigrade, and of the chlornitrobenzols I prefer the parachlornitrobenzol, $(C_6H_4ClNO_2.)$ Of the bromids I prefer to use the paradibrombenzol, $(C_6H_4Br_2.)$ Among the nitrobrombenzols I have successfully used the paranitrobenzol, $C_6H_4Br(NO_2.)$ Of the substances just mentioned the chlornitrobenzol and the nitrobrombenzol are difficult to procure in a colorless state. Hence I prefer to use them in applications where their color is not objectionable.

*The crystalline chlorids of naphthalene.*—There is a large number of chlorids of naphthalene, both additive and substitution products. I have employed with success naphthalene tetrachlorid, $(C_{10}H_8Cl_4;)$ also, naphthalene alpha-dichlorated, $(C_{10}H_6Cl_2,)$ naphthalene beta-dichlorid, $(C_{10}H_6Cl_2,)$ and naphthalene beta-monochlorid, $(C_{10}H_7Cl.)$ The latter three are substitution products.

*The crystalline phenolbromids and phenolchlorids.*—There is a large number of these substances, but I prefer to use phenol tribromid $(C_6H_3Br_3O)$ and phenol trichlorid, $(C_6H_3Cl_3O.)$ They are all inclined to yield yellowish products, and the phenol trichlorid, on account of a slight acid reaction, should be confined to colorless compounds, as it is apt to bleach out any delicate tints.

*Camphor bromid.*—I prefer to use the monobromcamphor, $(C_{10}H_{15}BrO,)$ as it is of a stable character and forms colorless products.

For additional information as to the state of the art and the various manipulations to which pyroxylin compounds are subjected I refer to my United States Patents No. 517,987, dated April 10, 1894, No. 542,692, dated July 16, 1895, and No. 543,197, dated July 23, 1895.

A mixture of camphor with any one or more of the members of the new group enumerated can be substituted for camphor or other solid solvents employed in manufacturing pyroxylin compounds and in the same proportions that are employed when camphor alone is used as the solid solvent. As to the proportions to be used, the substances specified as solvents in themselves can be used in larger proportions relatively to the camphor than those which are non-solvents, but I have found practically that satisfactory results are obtained by employing three or four parts of camphor to one part of any one member or to one part of a mixture of two or more of the members of the group of substances, but these proportions may be varied.

When employing either benzol bibromid the best results by employing the larger proor naphthalene tetrachlorid, I have obtained portions of camphor mentioned. With the other naphthalene chlorids named or trichlortoluol I find that I can use a smaller proportion of camphor with excellent results, even as low as two parts of camphor to one part of the specified chlorids. Many of these substances are of difficult solubility in the ordinary liquid menstrua employed in this art; but I have found that when mixed with camphor in the proportions given they are sufficiently soluble for practical work. The employment of my new solvents is not incompatible with the use of other solid solvents in connection with them should the necessities of the case require such mixtures.

It will be evident to the experienced operator in this art that as the plasticity of the seasoned pyroxylin compound made with these new solvents depends on the solvent power of the camphor acting in conjunction with one or more members of the specified group of new substances any heating of these compounds when in a dry or seasoned condition, even in the presence of liquid solvents, (the liquid solvent being insufficient in itself to give the desired plasticity to the compound,) is a use of the solvents of this specification. It is also true that regardless of the process used or in what order the ingredients are mixed the presence at any time of my new solvents in the compound imparts properties to such compound which it would not otherwise possess and is a utilization of my invention. I do not confine myself, therefore, to the use of any particular proportions of the substances embraced in the group of my new solvents, nor to any particular method in which they are used in pyroxylin compounds.

The result of my mixtures is a fluid solution or plastic mass, either of which when properly applied, manipulated, or formed into shape and then dried by allowing the liquid solvent to evaporate becomes a hard pyroxylin compound capable of being softened or formed into new shapes by the aid of heat and pressure in the customary manner.

By the application of heat or heat and pressure to the manipulation of these compounds I mean such operations as are commonly used in this art to mold or shape the seasoned or partly-seasoned product, whether it be by shaping in hot water, or forcing under heat through stuffing machinery, or molding in heated dies, or manipulating in heated rolls, or any analogous method.

It will be noticed that I have used the German terms "benzol" and "toluol," now little used in English, in describing benzene and toluene compounds.

Having thus described my invention, what I claim, and desire to secure by Letters Patent, is—

1. The process of manufacturing pyroxylin compounds which consists in intimately mixing pyroxylin, camphor and one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids, phenol chlorids and camphor bromids), and afterward subjecting the mixture to heat and pressure sufficient to render the compound plastic, substantially as described.

2. The process of manufacturing pyroxylin compounds which consists in intimately mixing pyroxylin, camphor, one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids, phenol chlorids and camphor bromids), and a liquid menstruum or liquid menstrua, and afterward subjecting the mixture to heat and pressure sufficient to render the compound plastic, substantially as described.

3. A new composition of matter containing pyroxylin, camphor, and one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol chlorids, phenol bromids and camphor bromids), substantially as described.

4. A new compound of pyroxylin containing pyroxylin and one or both varieties of the nitrochlorids of benzyl, substantially as described.

5. The process of manufacturing compounds of pyroxylin which consists in intimately mixing pyroxylin, camphor, one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids, phenol chlorids and camphor bromids), and a liquid menstruum or a liquid menstrua sufficient in amount to convert the entire mixture into a pyroxylin solution or compound, substantially as described.

6. As a new composition of matter, a compound of pyroxylin containing pyroxylin, one or more known solvents of pyroxylin, camphor, and one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol chlorids, phenol bromids and camphor bromids), substantially as described.

7. As a new composition of matter, a compound of pyroxylin, containing pyroxylin, camphor, one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids, phenol chlorids and camphor bromids) and a liquid menstruum or liquid menstrua, substantially as described.

8. The process of manufacturing pyroxylin compounds which consists in intimately mixing pyroxylin, camphor and a nitro derivative of one or more of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids, phenol chlorids and camphor bromids) and afterward subjecting the mixture to heat and pressure sufficient to render the compound plastic, substantially as described.

9. The process of manufacturing pyroxylin compounds, which consists in intimately mixing pyroxylin, camphor, one or more of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids, phenol chlorids and camphor bromids) and one or more nitro derivatives thereof, and afterward subjecting the mixture to heat and pressure sufficient to render the compound plastic, substantially as described.

10. A new composition of matter containing pyroxylin and one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids and phenol chlorids) substantially as described.

11. A new composition of matter containing pyroxylin, one or more members of the hereinbefore-specified new group of crystalline halogen substances (chlorids of toluol, nitrochlorids of benzyl, chlorids of benzol, bromids of benzol, nitrochlorids of benzol, nitrobromids of benzol, chlorids of naphthalene, phenol bromids and phenol chlorids) and one or more nitro derivatives of such substances, substantially as described.

In witness whereof I have hereunto signed my name this 1st day of November, 1895.

JOHN H. STEVENS.

In presence of—
 WALTER P. LINDSLEY,
 HENRY W. MAULL.